Sept. 22, 1953      A. WALSH      2,652,742

MONOCHROMATOR

Filed Aug. 7, 1951      2 Sheets-Sheet 1

INVENTOR:
ALAN WALSH.
by *[signature]*
Attorney.

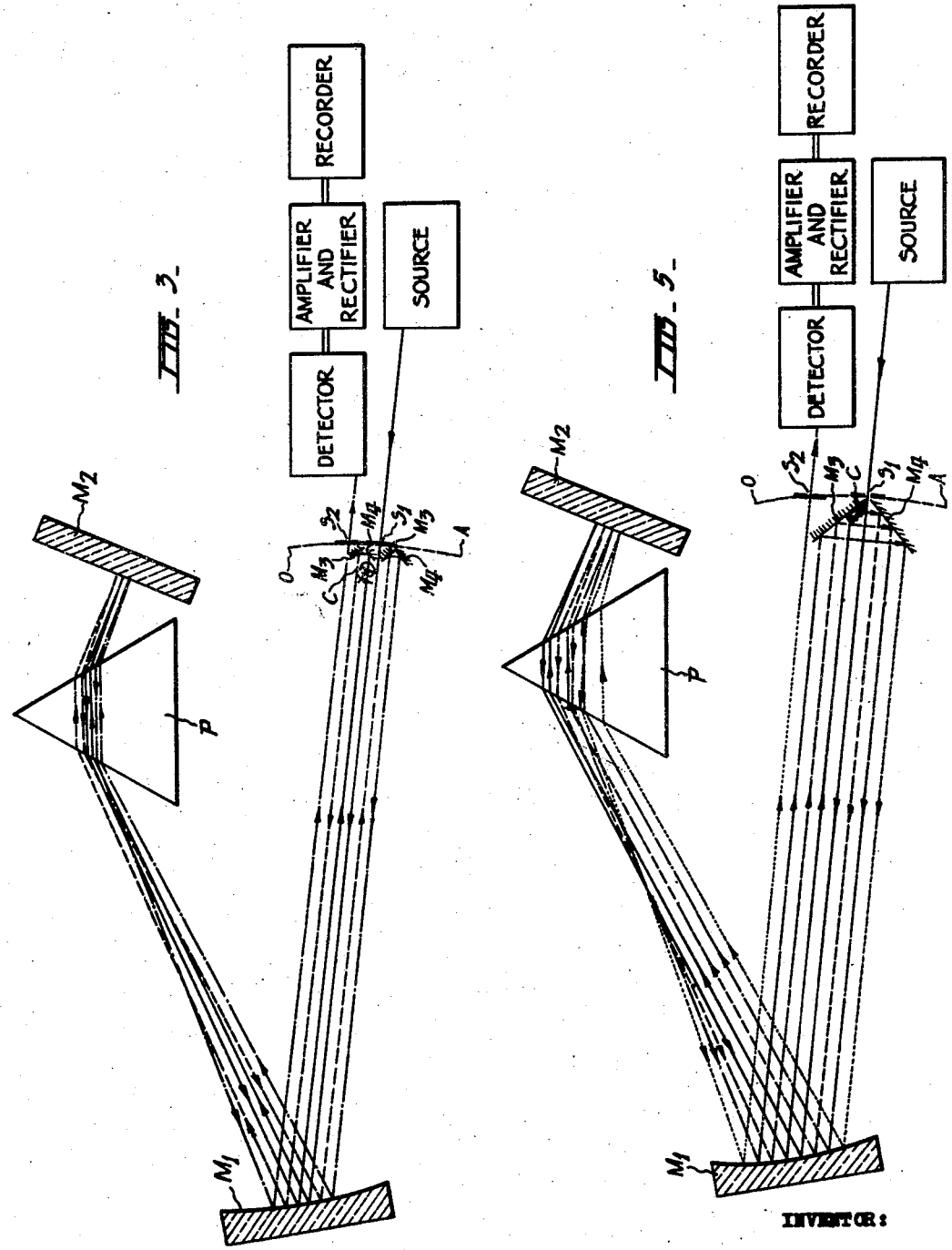

Patented Sept. 22, 1953

2,652,742

UNITED STATES PATENT OFFICE 2,652,742

MONOCHROMATOR

Alan Walsh, Canterbury, Victoria, Australia, assignor to Commonwealth Scientific and Industrial Research Organization, East Melbourne, Victoria, Australia, a body corporate Application August 7, 1951, Serial No. 240,737
In Australia November 9, 1950

4 Claims. (Cl. 88—14)

My invention relates to monochromators used for measuring the distribution of intensity in a spectrum. Objects of my invention are to provide a multiple monochromator having much higher resolving power than that of a single monochromator and giving almost total elimination of scattered radiation. Another object of my invention is, alternatively, to provide a multiple monochromator capable of transmitting greater energy than a single monochromator for the same resolving power.

I attain these objects by means illustrated in the accompanying drawings, in which—

Figure 4:
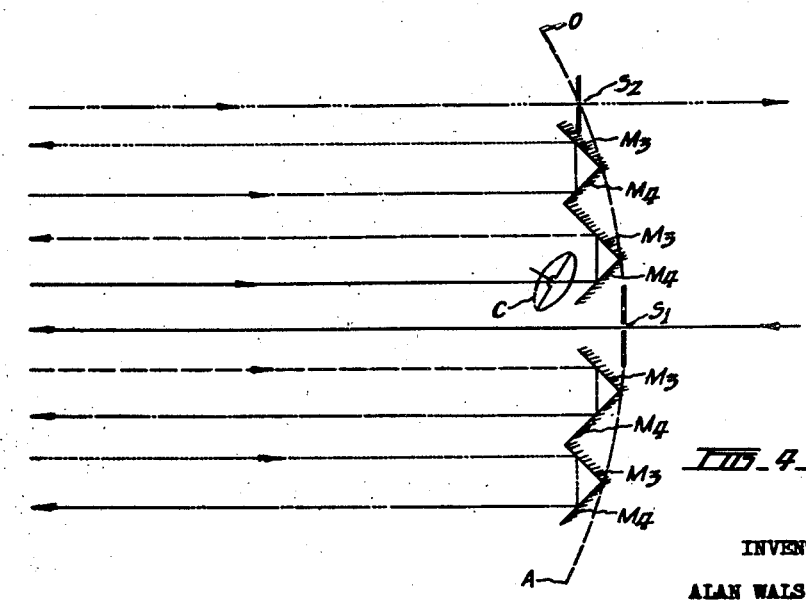

Figure 3 schematically illustrates another embodiment of the invention forming a triple monochromator;

Figure 4 schematically illustrates the arrangement of reflectors in accordance with still another embodiment of the invention and forming a quintuple monochromator; and Figure 5 schematically illustrates an arrangement in accordance with a still further embodiment of the invention and providing a quadruple monochromator.

A monochromator is an instrument for selecting a given portion of a spectrum. Sometimes when it is used to measure the distribution of intensity it is called a spectrophotometer but it is referred to herein as a monochromator.

Figure 1:
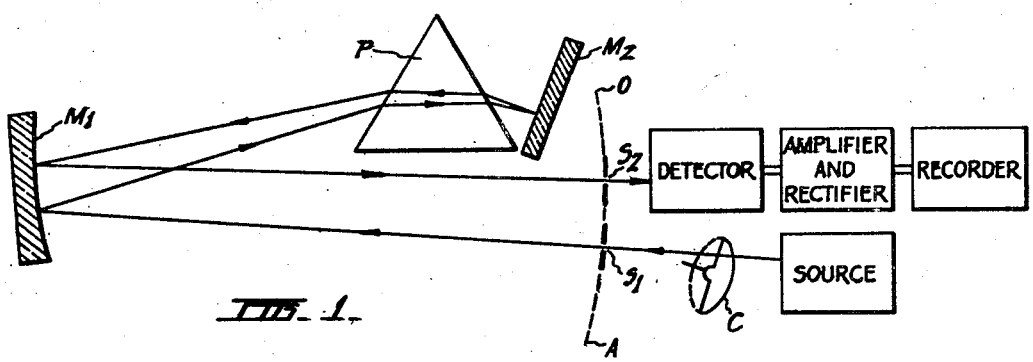
Figure 1 shows schematically the optical system of a conventional infra-red monochromator and its recording accessories.

In the conventional monochromator shown in Figure 1 along with its recording accessories the radiation focused on the entrance slit S1 passes on to the off-axis paraboloid mirror M1. The collimated beam is dispersed by a prism P and reflected back to the prism by a plane mirror M2. After further dispersion by the prism P the beam falls again on the collimating mirror M1, by which radiation of a given wave length is focused on the exit slit S2, the emergent beam being then focused on a detector which may be a thermocouple or other suitable conventional device. The mirror M2 is set so that radiation of a given wave length passes through the exit slit S2, the band-width in a given monochromator being determined by the widths of the entrance and exit slits.

A radiation chopper C is sometimes placed outside of the monochromator between the source and the entrance slit to interrupt, at a given frequency, the incident beam, and the amplifier used to amplify the output of the detector is tuned to the same frequency. Thus the effects on the detector of thermal drifts in the surrounding atmosphere (which are not thus interrupted) are eliminated.

Figure 2:
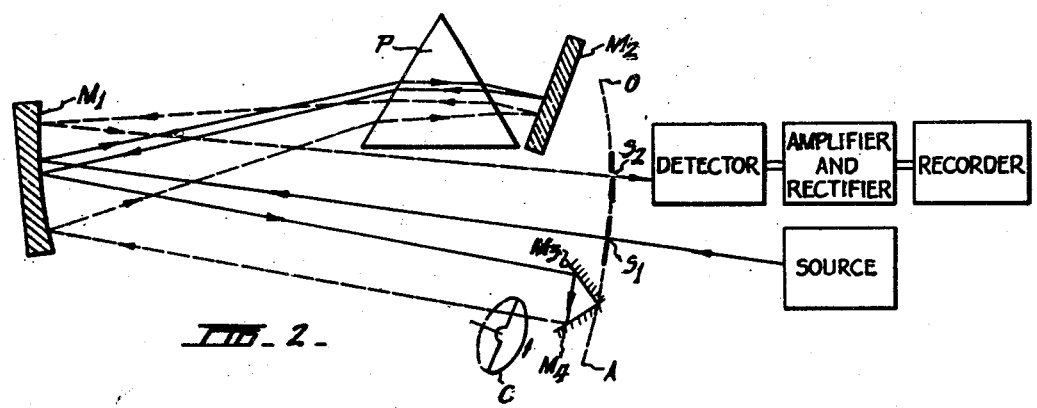
Figure 2 shows schematically a modification of that monochromator and its recording accessories in accordance with the present invention to form a double monochromator.

If the mirror M2 is set so that radiation of wave length V1 falls on the exit slit S2, radiation of other wave lengths will be in focus at other points on the focal curve OA of the monochromator. The conventional system of a monochromator shown in Figure 1 may be converted to a double monochromator system, in accordance with my invention and as shown in Figure 2, by placing two additional mirrors M3, M4 at right angles to each other and with their adjacent edges positioned adjacent to the focal curve OA of the monochromator. The phrase "adjacent to the focal curve" is intended to include "on the focal curve." In Figure 2 the mirrors M3, M4 are shown with the intersection of their planes on that focal curve. With this arrangement, radiation of a given wave length V2 will be reflected back to the mirror M1, thence through the dispersion system and finally through the exit slit S2. The term "mirrors" is used herein to include any suitable reflecting surfaces; for example, two faces of a right angled prism might each be provided with a mirror surface.

Radiation which has passed only once through the dispersion system before passing through the exit slit as in Figure 1 will be referred to as "first-order" radiation, and radiation which, by means of the mirrors M3, M4, has been twice through the dispersion system before passing through the exit slit as in Figure 2 as "second-order" radiation. It will be clear that first-order radiation of wave length V1 will pass through the exit slit at the same time as second-order radiation of a different wave length V2. In order to isolate the second-order radiation from the first-order, the radiation chopper C, which is preferably a rotating interrupter, instead of being placed in front of the source is arranged to interrupt the radiation in the vicinity of the mirrors M3, M4. The first-order radiation then does not register at the amplifier output since the amplifier of the signal produced by the detector is tuned to the same frequency as the radiation chopper and uninterrupted radiation gives no output signal. The second-order spectrum, however, is interrupted at the correct frequency and thus gives a signal at the output from the amplifier.

The second-order spectrum has approximately twice the dispersion of the first-order spectrum, thus yielding increased resolution for the same "signal-to-noise ratio" of the amplified output of the detector. For a perfect detector the theoretical resolving power of a double monochromator is approximately twice that of a single monochromator. Alternatively, the second-order spectrum gives an increased signal-to-noise ratio for a given resolution since the same resolution can be produced with wider slits.

Another important advantage is the virtual elimination of scattered light. The mirrors M3, M4 are small and therefore receive only a small amount of scattered radiation which is almost entirely removed by the second passage through the optical system so that the second-order spectrum passing through S2 is virtually free from scattered radiation.

The use of mirrors to reflect the radiation back through the dispersion system to give second-order radiation may be extended to give third, fourth or higher order of radiation, and the use of a radiation chopper to isolate radiation of a given order which passes through the exit slit can be adapted readily to the construction of a corresponding multiple monochromator. Such an instrument would give a several-fold increase of resolution compared with a single monochromator. This may be effected by the use of two or more pairs of mirrors M3 and M4, for example, as shown in Figures 3 and 4 wherein two pairs of mirrors and four pairs of mirrors are respectively shown.

If desired the entrance slit instead of being positioned at one side of the mirrors M3, M4, may be positioned between them, as shown in Figure 5, and these mirrors can be used to give several traversals of the optical system so that the arrangement in Figure 5 provides a quadruple monochromator. While the choppers of Figures 2, 3 and 4 are shown to be of the rotating interrupter type, the chopper in the embodiment of Figure 5 is shown as an oscillating interrupter only because the latter can be more readily employed when the adjacent beams are relatively close to each other.

It is known to couple two monochromators in series to form a double monochromator, but this is cumbersome and expensive because monochromators are costly instruments. Also it is difficult to couple them together accurately. I am not aware of any previous coupling together of more than two monochromators.

By application of my invention a single monochromator is changed in a simple manner to a multiple monochromator embodied in a single instrument.

My invention is of general application to all types of monochromators used in the measurement of intensity. It is of particular value in the case of infra-red monochromators. It has therefore been described in relation to an infra-red monochromator and primarily in relation to the conversion of a conventional infra-red monochromator to a double monochromator. The method herein described for converting a conventional monochromator to a multiple monochromator can be applied equally to monochromators of other types, including those using diffraction gratings and those using lenses. The term "through the dispersion system" therefore includes reflection from a diffraction grating.

The only alteration to the single monochromator construction that is required, other than the inclusion of additional mirrors and the radiation chopper, is the modification of the jaws of the exit and/or entrance slit, to accommodate the curvature of the second and higher-order images of the entrance slit relative to the curvature of that slit. In cases where a long slit length is used, it is desirable to place the equivalent of a field lens in the vicinity of the additional mirrors; otherwise some of the radiation reflected from said mirrors will fall outside the optical system. The effect of a field lens can be obtained by making one or more of the additional mirrors curved instead of plane.

I claim:

1. In combination with a single monochromator having a dispersion system for directing a selected wave-length of radiation from a source to an exit slit, and recording accessories; additional mirrors within said monochromator positioned to reflect back radiation of a given wave length which has passed through said dispersion system of said monochromator and causing said radiation to pass repeatedly through said dispersion system before passing through said exit slit of said monochromator, a radiation chopper arranged to interrupt at a given frequency only that radiation which passes repeatedly through said dispersion system a predetermined number of times before passing through said exit slit, a detector positioned to respond to the radiation passing through said exit slit, and an amplifier receiving the detector output and tuned to said given frequency.

2. The combination of a single monochromator having a dispersion system for directing a selected wavelength of radiation from a source to an exit slit on the focal curve of the monochromator, two additional plane mirrors which are arranged at right angles to each other and have the intersection of their planes positioned adjacent to said focal curve of said monochromator and are disposed to reflect back radiation of a given wave length which has passed through the dispersion system of said monochromator and to cause said radiation to pass again through said dispersion system before passing through said exit slit, a radiation chopper arranged to interrupt at a given frequency only that radiation which passes twice through said dispersion system before passing through the exit slit, a detector positioned to respond to the radiation passing through said exit slit, and an amplifier receiving the detector output and tuned to said given frequency.

3. The combination of a single monochromator having a dispersion system for directing a selected wavelength of radiation from a source to an exit slit on the focal curve of the monochromator, a plurality of pairs of additional plane mirrors, the mirrors of each pair being arranged at right angles to each other and having the intersection of their planes positioned adjacent to said focal curve of said monochromator, and said additional mirrors being disposed to cause radiation of a given wave length to pass through the dispersion system of said monochromator a predetermined number of times before passing through said exit slit of said monochromator, a radiation chopper arranged to interrupt at a given frequency only that radiation which passes through said dispersion system the said predetermined number of times before passing through said exit slit, a detector positioned to respond to the radiation passing through said exit slit, and an amplifier receiving the detector output and tuned to said given frequency.

4. The combination claimed in claim 1, in which said additional mirrors are two plane mirrors at right angles to each other and having an entrance slit positioned between them to admit radiation from said source into said dispersion system.

ALAN WALSH.

References Cited in the file of this patent

UNITED STATES PATENTS

| Number | Name | Date |
|---|---|---|
| 2,502,319 | Golay | Mar. 28, 1950 |

OTHER REFERENCES

Baly, E. C. C. Text on Spectroscopy, vol. 1, third edition, published in 1924 by Longmanns, Green and Co., New York, New York, pages 50 through 53, 105 and 109.